US008944917B2

(12) United States Patent
Geisner et al.

(10) Patent No.: US 8,944,917 B2
(45) Date of Patent: Feb. 3, 2015

(54) MULTI-TIER ONLINE GAME PLAY

(75) Inventors: Kevin Geisner, Seattle, WA (US); Chee Chew, Redmond, WA (US); Andrew Royal, Seattle, WA (US); Martin Sleeman, Redmond, WA (US); Rob SanFilippo, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1498 days.

(21) Appl. No.: 11/694,535

(22) Filed: Mar. 30, 2007

(65) Prior Publication Data

US 2008/0242421 A1  Oct. 2, 2008

(51) Int. Cl.
*A63F 9/24* (2006.01)
*A63F 13/30* (2014.01)

(52) U.S. Cl.
CPC ......... *A63F 13/12* (2013.01); *A63F 2300/5513* (2013.01); *A63F 2300/5546* (2013.01); *A63F 2300/5586* (2013.01)
USPC ........................................................ 463/42

(58) Field of Classification Search
CPC .............. A63F 13/12; A63F 2300/406; A63F 2300/572; A63F 2300/556; A63F 2300/5566; A63F 2300/407; A63F 2300/5546; A63F 2300/408; A63F 2300/8023; A63F 2300/201; A63F 2300/402; G07F 17/3276; G07F 17/3272; G07F 17/3211
USPC ................................................... 463/25, 42
See application file for complete search history.

(56) References Cited

U.S. PATENT DOCUMENTS

| | | | |
|---|---|---|---|
| 6,712,702 B2 | 3/2004 | Goldberg et al. | 463/42 |
| 6,758,746 B1 * | 7/2004 | Hunter et al. | 463/9 |
| 7,094,154 B2 | 8/2006 | Kellerman et al. | 463/42 |
| 2002/0143652 A1 | 10/2002 | Beckett | 705/26 |
| 2003/0032476 A1 * | 2/2003 | Walker et al. | 463/25 |
| 2003/0177187 A1 * | 9/2003 | Levine et al. | 709/205 |
| 2003/0181242 A1 * | 9/2003 | Lee et al. | 463/42 |
| 2003/0186744 A1 * | 10/2003 | Bradell | 463/42 |
| 2003/0190960 A1 | 10/2003 | Jokipii et al. | 463/42 |
| 2003/0216181 A1 * | 11/2003 | Danieli et al. | 463/39 |
| 2004/0002384 A1 * | 1/2004 | Multerer et al. | 463/42 |
| 2004/0063497 A1 * | 4/2004 | Gould | 463/42 |
| 2004/0143852 A1 * | 7/2004 | Meyers | 725/133 |

(Continued)

OTHER PUBLICATIONS

Lu Wang, C. et al., "Subscription to Fee-Based Online Services: What makes Consumer Pay for Online Content?", *Journal of Electronic Commerce Research*, 2005, 6(4), 304-311.

(Continued)

*Primary Examiner* — Steve Rowland
(74) *Attorney, Agent, or Firm* — Ladislav Kusnyer; Micah Goldsmith; Micky Minhas (57) ABSTRACT

Online multiplayer games are provided in multiple tiers. A first tier offers limited features and a second tier offers first tier features plus additional features. The additional features are exclusive to the second tier. During game play in the first tier, enticements are provided to participate in the second tier. The first tier requires no subscription to participate therein. Participation in the second tier requires a subscription. In an example configuration, the first tier allows players to host a game on a dedicated server, browse a list of dedicated server games, and join a game from a list of first tier eligible games. And, the second tier offers a variety of additional features, such as the ability to invite other players to join a game session, match making services, and cross-platform game play.

19 Claims, 5 Drawing Sheets

(56) References Cited

U.S. PATENT DOCUMENTS

| | | | |
|---|---|---|---|
| 2004/0242325 A1 | 12/2004 | Levitan et al. | 463/41 |
| 2005/0027595 A1 | 2/2005 | Ha et al. | 705/14 |
| 2005/0245317 A1* | 11/2005 | Arthur et al. | 463/42 |
| 2006/0046807 A1 | 3/2006 | Sanchez | 463/9 |
| 2006/0080702 A1* | 4/2006 | Diez et al. | 725/30 |
| 2006/0123117 A1* | 6/2006 | Heutchy et al. | 709/227 |
| 2006/0189393 A1 | 8/2006 | Edery | 463/58 |
| 2006/0258422 A1 | 11/2006 | Walker et al. | 463/7 |
| 2006/0287106 A1* | 12/2006 | Jensen | 463/42 |
| 2007/0117608 A1* | 5/2007 | Roper et al. | 463/16 |
| 2007/0129123 A1* | 6/2007 | Eryou et al. | 463/1 |
| 2007/0233291 A1* | 10/2007 | Herde et al. | 700/91 |
| 2008/0091528 A1* | 4/2008 | Rampell et al. | 705/14 |
| 2008/0098064 A1* | 4/2008 | Sherinian | 709/203 |

OTHER PUBLICATIONS

List of Membership Levels, http://brainking.com/en/PaidMembership, 2002-2007 ©, 4 pages.

Xbox 360 Features, http://www.xbox.com, 2 pages.

* cited by examiner

30 — Provide First Tier Online Game Playing Features
- Host Dedicated Processor Multiplayer Online Game Session
- Browse List Of Dedicated Processor Multiplayer Online Game Sessions
- Join A Game From A List Of Game Sessions Limited To First Tier Participation

32 — Provide Second Tier Online Game Playing Features
- Provide Invitation To Join Game Sessions
- Earn Achievements And Game Score On Multiplayer Games
- Earn Ranking
- Voice Communications
- Matchmaking Services
- Send And Receive Game Invites
- Play In Full Sized Games (Max Allowed Number Of Players)
- Play In Second Tier Only Game Sessions
- Cross Platform Participation

34 — Provide Enticements To Participate In Second Tier
- First Tier Players Can Hear But Not Be Heard
- Emphasize Features Not Available To First Tier Players
- Render Matchmaking Services And Deny Access
- Provide Post Game Session Indication Of Achievements And Score That Could Have Been Earned
- Receive Invitations But Can Not Accept
- Limit Maximum Number Of First Tier Players In A Game Session

MULTI-TIER ONLINE GAME PLAY

TECHNICAL FIELD

The technical field relates generally to computer processing and more specifically to on-line gaming.

BACKGROUND

Two prevailing models exist today for offering online game play. One model offers free game play and is supported by advertisements. A drawback, however, of subscription-free, advertisement-supported online game playing is that it typically does not generate sufficient revenue for the provider of the online game service. The other model offers, with a paid subscription, full-featured services, such as multi-player gaming, game hosting, community management, communications, and the like. This pure fee model, however, may prevent game players from subscribing if the subscription fee is too expensive. Also, although a pure fee model may offer a higher quality service than a subscription-free, advertisement-supported model, it can be difficult to entice game players to leave a subscription-free, advertisement-supported model. Yet another problem with the pure fee model is that publishers of game titles may not be willing to publish new titles because of an apprehension that players will not subscribe, thus limiting games sales.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

Multi-tier online game playing offers a limited form of multiplayer online gaming in one tier and offers additional, exclusive multiplayer online gaming features in a second tier. The first tier provides enticements to participate in the second tier. The first tier is free to players. That is, there is no subscription required to participate in the first tier. The second tier requires a subscription. In an example embodiment, the first tier online gaming experience is comparable to other no fee online game services. The second tier, however, offers a richer, more feature full multiplayer online gaming experience than offered by the first tier. For example, the first tier can allow a player to host a game on a dedicated server, browse a list of dedicated server games, join a game from a list of first tier eligible games, or the like. The second tier offers a variety of additional features, such as the ability to invite other players to join a game session, match making services, and cross-platform game play, for example.

BRIEF DESCRIPTION OF THE DRAWINGS

The foregoing summary, as well as the following detailed description, is better understood when read in conjunction with the appended drawings. For the purpose of illustrating multi-tier online game play, there is shown in the drawings exemplary constructions thereof, however, multi-tier online game play is not limited to the specific methods and instrumentalities disclosed.

DETAILED DESCRIPTION OF ILLUSTRATIVE EMBODIMENTS

Figure 1:
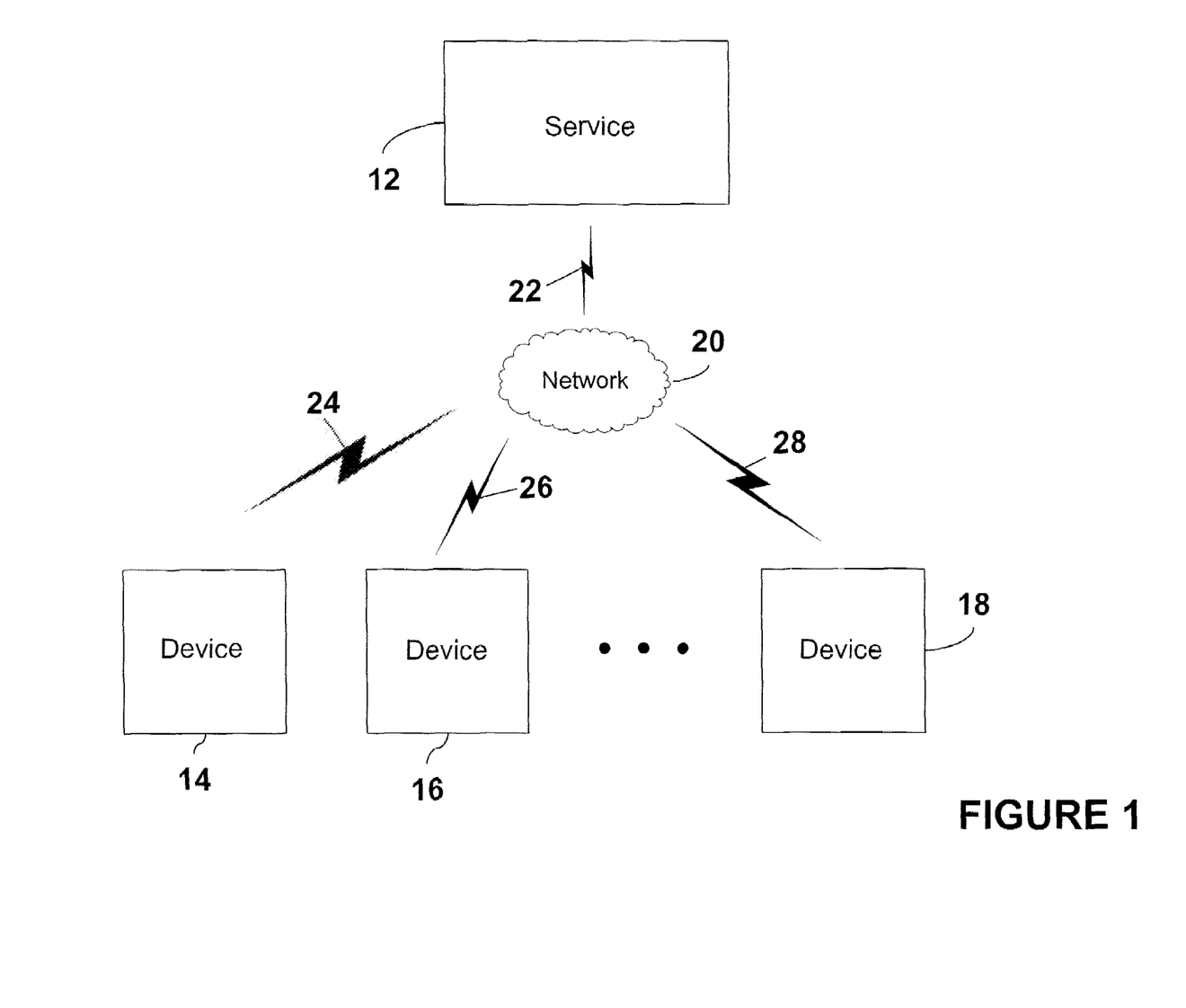
FIG. 1 is an illustration of a multi-tier online gaming system.

FIG. 1 is an illustration of a multi-tier online gaming system comprising a game service 12 coupled to the devices 14, 16, and 18 via a network 20. The game service 12 can comprise any appropriate service capable of providing multi-tier online gaming services. The service 12 can comprise any appropriate combination of processors and the like to provide multi-tier online gaming services. The network 20 can comprise any appropriate network, such as a local area network (LAN), a wide area network, the internet, a home network, and enterprise network, or a combination thereof, for example. The devices 14, 16, and 18, represent any number of devices, including a single device. Each device 14, 16, and 18, can comprise any appropriate device capable of game playing, such as a dedicated console (e.g., XBOX®, XBOX® 360, a general purpose processor such as a laptop, PC, desktop, server, or the like. For example, each of the devices 14, 16, and 18 can comprise a game console, a set-top box, a portable phone, a portable entertainment device, a personal digital assistant (PDA), or the like. The service 12 and the devices 14, 16, and 18, are coupled to the network 20, via interfaces 22, 24, 26, and 28, respectively. The interfaces 22, 24, 26, and 28, are representative of any appropriate interface, such as a wireless interface, a wired interface, or a combination thereof.

In accordance with multi-tier online game play, the service 12 provides to the devices 14, 16, 18, two tiers of game play. It is to be understood that multi-tier online game play is not limited to two tiers, and that more tiers of game play are applicable. In an example embodiment, a first tier provides a first set of multiplayer online game features and a second tier provides additional, exclusive multiplayer online game features. The additional features provided in the second tier are exclusive to the second tier and are not available to players participating in the first tier. While participating in a first tier online game session, via at least one of the devices 14, 16, 18, a player is provided, by the service 12, enticements to participate in the second tier. In an example embodiment, the first tier does not require a subscription to participate therein and the second tier does require a subscription. In yet another example embodiment, the subscription to participate in the second tier is fee based. Thus, the participation in the first tier is free and participation in the second tier requires a paid subscription.

In an example embodiment, the first tier comprises multiplayer online game features such as the ability to host dedicated server game sessions, browse a list of dedicated server game sessions, and join a game from a list of game sessions that are eligible to first tier participation. Hosting a dedicated server game session comprises executing an application on a processor that provides master game controls and communications to all players participating in the multiplayer game session. Each player, including the one who sets up the dedicated server, executes an instance of the game application, each of which connects to the dedicated server via which all in-game player to player interaction and communication occur. Dedicated servers provide a persistent game to which players can connect and participate over time.

Exclusive multiplayer online game features of the second tier can include the ability to invite other players to join a game session. In an example configuration, a first tier player (a player participating in an online game session at the first tier) can see a list of game sessions available for first tier players and second tier players (players participating in an online game session at the second tier). However, the game sessions that do not allow participation at the first tier can be emphasized, such as highlighted or grayed out, for example. A second tier player, on the other hand, is provided the same list of game sessions, but none of the game sessions are emphasized (e.g., none of the game sessions are grayed out). The emphasis of the game sessions provides an enticement to a first tier player to participate at the second tier level.

Other exclusive second tier online game play features include the ability to earn points for achievements during a game session in the second tier and receiving a Gamerscore (game score) of a game session in the second tier. First tier players do not earn points or receive a Gamerscore from an online game session. In an example embodiment, upon the conclusion of an online game session, first tier players of the game session are provided an indication of the points and Gamerscore that could have been earned if the player had participated in the online game session at the second tier. The provision of the achievement points that could have been earned and the indication of the Gamerscore that could have been achieved are enticements to participate in the second tier.

Another exclusive second tier online game play features includes earning ranking among other second tier players. Also, the second tier provides the ability to send invitations to other players to join a game session and to accept invitations to join a game session. In an example embodiment, as an enticement to participate in the second tier, first tier players can be provided invitations to join an online multiplayer game session, but be denied the ability to accept the invitation. This could be implemented for example, if a first tier player receives an invitation to join a second tier only game session, and/or if a first tier player receives an invitation to join a game session that already contains a maximum number of first tier players.

Yet another exclusive feature of the second tier is the provision of voice communications among second tier players during an online multiplayer game session. In an example configuration, first tier players can hear other players but can not be heard by other players. The ability to hear and not be heard is an enticement to participate in the second tier.

A multiplayer online game session is typically limited, by the service (e.g., the service 12), to a maximum number of players, such as 8 players, for example. In an example embodiment, as an enticement to participate in the second tier, the number of first tier players allowed to join a multiplayer online game session is less than the maximum number of players. And, the number of second tier players allowed to join the multiplayer online game session is equal to the maximum number of players. For example, a multiplayer online game session could be limited to a maximum of 8 players, only 4 of which can be first tier players.

Another exclusive feature provided at the second tier is the ability to utilize matchmaking services. A matchmaking service attempts to use player specific parameters to characterize what would constitute a high quality game experience, and use weightings of these attributes to automatically link players with compatible attributes in the same game session. Example attributes used to architect high quality matches include (but are not limited to) spoken language, skill level in the game, competitive nature (fun oriented vs. competitive), family appropriateness, parental controls, or the like. In an example embodiment, indications of a matchmaking service can be rendered on a display of a first tier player's game playing device, such as devices 14, 16, 18, but the first tier player can not access the matchmaking service. For example a tier 1 player can see a list of multiplayer game modes available, but only ListPlay would be accessible. Player Match, Ranked Match, Join a Friend, would be shown as options, but grayed out.

Cross platform online game play is another exclusive feature offered in the second tier. Cross platform online game play refers to the ability to participate in a multiplayer online game session via different types of game devices. Example game devices include a PC, a general purpose processor, a dedicated game console (e.g., XBOX®, XBOX® 360), a mobile device, a PDA, or a combination thereof, for example. Thus, as an enticement to participate in the second tier, first tier player participation can be limited to a single type of game device, or exclude a type of game device. For example, first tier participation could be limited to only dedicated game consoles and exclude PCs.

Figure 2:
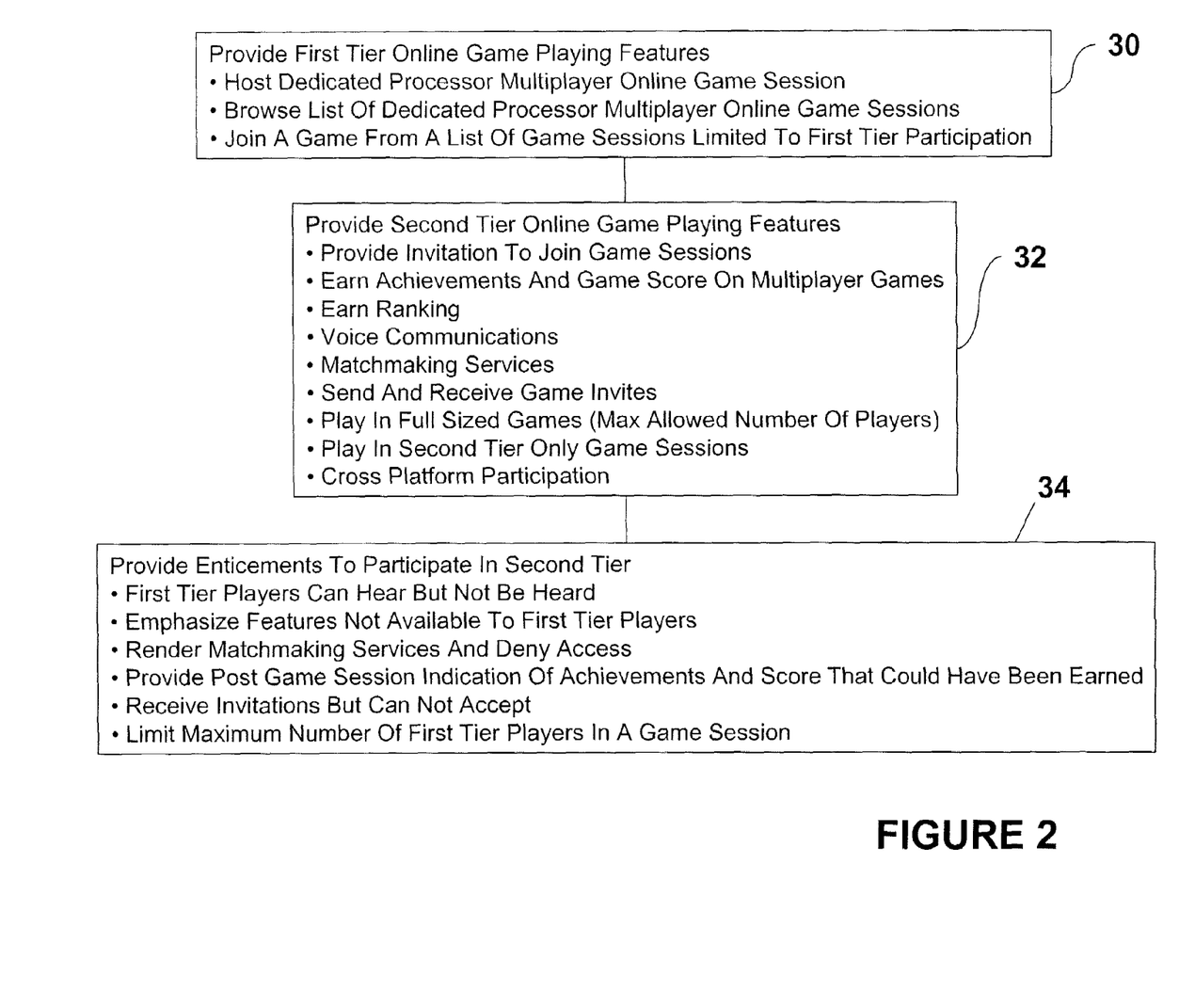
FIG. 2 is a flow diagram of an example process for multi-tier online game playing.

FIG. 2 is a flow diagram of an example process for multi-tier online game playing. At step 30, first tier online game playing features are provided. As described above, first tier online game features can include the ability to host dedicated server game sessions, browse a list of dedicated server game sessions, and join a game from a list of game sessions that are limited to first tier participation.

Second tier game features are provided at step 32. Second tier game features include the first tier game features and additional features exclusive to the second tier. In an example implementation, the first tier is made available without a subscription or fee. The second tier is made available with a subscription and optionally with a fee. As described above, exclusive second tier game features include the ability to invite other players to join a game session, the ability to earn points for achievements during a game session, the ability to receive a game score of a game session, the ability to earn ranking among other second tier players, the provision of voice communications among second tier players during an online multiplayer game session, the ability to utilize matchmaking services, the ability to send invitations to join a game session and to accept invitations to join a game session, the ability to allow the maximum number of second tier players to participate in a game session, the ability for second tier players to participate in a second tier only game session, and allowing cross platform multiplayer online game play.

Enticements to participate in the second tier are provided at step 34. As described above, enticements include the ability for first tier players to hear other players but not be heard by other players; emphasizing features not available to first tier players, such as matchmaking services, second tier only game sessions; rendering matchmaking services and denying access thereto; providing, at the conclusion of a game session, an indication of the achievement points that could have been earned and an indication of the game score that could have been achieved during the game session; the ability for first tier players to receive invitations to join an online multiplayer game session, but be denied the ability to accept the invitation; and limiting the number of first tier players that can join a game session to less than the maximum number of players that can join the game session.

Figure 3:
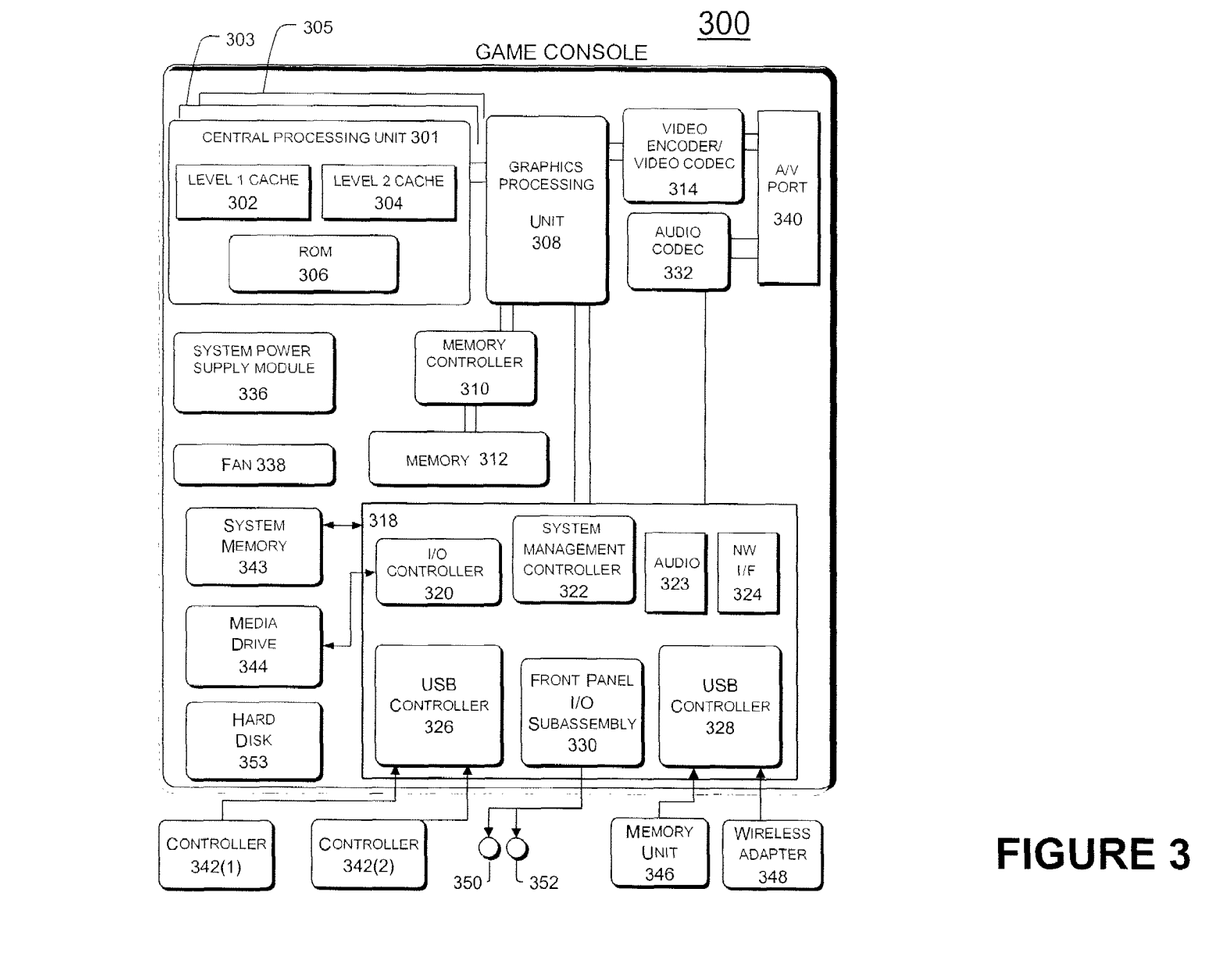
FIG. 3 is a block diagram of an example game console in which multi-tier online game play can be accomplished.

As described above, the device (e.g., devices 14, 16, 18, in FIG. 1) used by players to participate in an online game session can comprise a PC, a general purpose processor, a mobile device, a PDA, a dedicated game console or a combination thereof. FIG. 3 is a block diagram of an example game console 300 in which multi-tier online game play can be accomplished. The game console 300 along with other devices described herein, such as a display device, are capable of performing the functions needed to accomplish multi-tier online game play, as describe above. Game console 300 is an example of a dedicated host system, although, as noted above, a game console is only one example of a dedicated host device. A typical game console comprises hardware and software that are specifically designed to support a core set of usage scenarios.

Game console 300 has a central processing unit (CPU) 301 having a level 1 (L1) cache 302, a level 2 (L2) cache 304, and a flash ROM (Read-only Memory) 306. The level 1 cache 302 and level 2 cache 304 temporarily store data and hence reduce the number of memory access cycles, thereby improving processing speed and throughput. The flash ROM 306 can store executable code that is loaded during an initial phase of a boot process when the game console 300 is initially powered. Alternatively, the executable code that is loaded during the initial boot phase can be stored in a FLASH memory device (not shown). Further, ROM 306 can be located separate from CPU 301. Game console 300 can, optionally, be a multi-processor system; for example game console 300 can have three processors 301, 303, and 305, where processors 303 and 305 have similar or identical components to processor 301.

A graphics processing unit (GPU) 308 and a video encoder/video codec (coder/decoder) 314 form a video processing pipeline for high speed and high resolution graphics processing. Data is carried from the graphics processing unit 308 to the video encoder/video codec 314 via a bus. The video processing pipeline outputs data to an A/V (audio/video) port 340 for transmission to a television or other display device. A memory controller 310 is connected to the GPU 308 and CPU 301 to facilitate processor access to various types of memory 312, such as, but not limited to, a RAM (Random Access Memory).

Game console 300 includes an I/O controller 320, a system management controller 322, an audio processing unit 323, a network interface controller 324, a first USB host controller 326, a second USB controller 328 and a front panel I/O subassembly 330 that may be implemented on a module 318. The USB controllers 326 and 328 serve as hosts for peripheral controllers 342(1)-342(2), a wireless adapter 348, and an external memory unit 346 (e.g., flash memory, external CD/DVD ROM drive, removable media, etc.). The network interface 324 and/or wireless adapter 348 provide access to a network (e.g., the Internet, home network, etc.) and may be any of a wide variety of various wired or wireless interface components including an Ethernet card, a modem, a Bluetooth module, a cable modem, and the like.

System memory 343 is provided to store application data that is loaded during the boot process. A media drive 344 is provided and may comprise a DVD/CD drive, hard drive, or other removable media drive, etc. The media drive 344 may be internal or external to the game console 300. When media drive 344 is a drive or reader for removable media (such as removable optical disks, or flash cartridges), then media drive 344 is an example of an interface onto which (or into which) media are mountable for reading. Application data may be accessed via the media drive 344 for execution, playback, etc. by game console 300. Media drive 344 is connected to the I/O controller 320 via a bus, such as a Serial ATA bus or other high speed connection (e.g., IEEE 3394). While media drive 344 may generally refer to various storage embodiments (e.g., hard disk, removable optical disk drive, etc.), game console 300 may specifically include a hard disk 352, which can be used to store game data, application data, or other types of data, and on which the file systems depicted in FIGS. 3 and 4 may be implemented.

The system management controller 322 provides a variety of service functions related to assuring availability of the game console 300. The audio processing unit 323 and an audio codec 332 form a corresponding audio processing pipeline with high fidelity, 3D, surround, and stereo audio processing according to aspects of the present subject matter described herein. Audio data is carried between the audio processing unit 323 and the audio codec 326 via a communication link. The audio processing pipeline outputs data to the A/V port 340 for reproduction by an external audio player or device having audio capabilities.

The front panel I/O subassembly 330 supports the functionality of the power button 350 and the eject button 352, as well as any LEDs (light emitting diodes) or other indicators exposed on the outer surface of the game console 300. A system power supply module 336 provides power to the components of the game console 300. A fan 338 cools the circuitry within the game console 300.

The CPU 301, GPU 308, memory controller 310, and various other components within the game console 300 are interconnected via one or more buses, including serial and parallel buses, a memory bus, a peripheral bus, and a processor or local bus using any of a variety of bus architectures.

When the game console 300 is powered on or rebooted, application data can be loaded from the system memory 343 into memory 312 and/or caches 302, 304 and executed on the CPU 301. The application can present a graphical user interface that provides a consistent user experience when navigating to different media types available on the game console 300. In operation, applications and/or other media contained within the media drive 344 may be launched or played from the media drive 344 to provide additional functionalities to the game console 300.

The game console 300 may be operated as a standalone system by simply connecting the system to a television or other display. In this standalone mode, the game console 300 may allow one or more users to interact with the system, watch movies, listen to music, and the like. However, with the integration of broadband connectivity made available through the network interface 324 or the wireless adapter 348, the game console 300 may further be operated as a participant in a larger network community.

Figure 4:
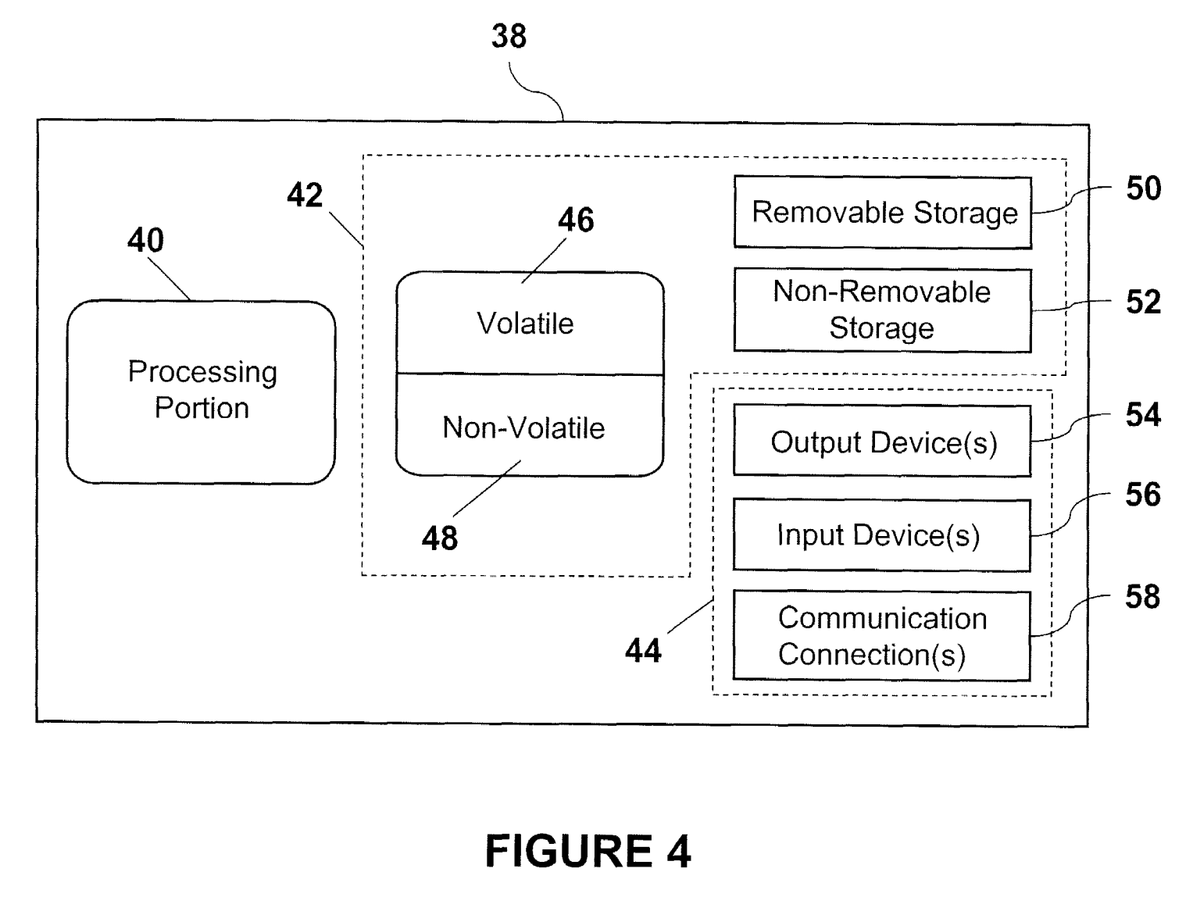
FIG. 4 is a diagram of an exemplary processor 38 for providing or participating in multi-tier online gaming services.

As described above, the multi-tier online game service (e.g., service 12 in FIG. 1) can comprise a processor or combination of processors. FIG. 4 is a diagram of an exemplary processor 38 for providing or participating in multi-tier online gaming services. Further, the processor 38 can represent a general purpose processor used by a player to participate in multi-tier online game play.

The processor 38 comprises a processing portion 40, a memory portion 42, and an input/output portion 44. The processing portion 40, memory portion 42, and input/output portion 44 are coupled together (coupling not shown in FIG. 4) to allow communications therebetween. The input/output portion 44 is capable of providing and/or receiving components utilized to perform multi-tier online game play as described above. For example, the input/output portion 44 is capable of, as described above, providing first tier game features, providing second tier game features, providing enticements to participate in the second tier, and/or receiving responses thereto.

The processing portion 40 is capable of performing multi-tier online game play as described above. For example, the processing portion 40 is capable of determining first tier game features, determining second tier game features, determining enticements to participate in the second tier, or a combination thereof.

The processor 38 can be implemented as a client processor and/or a server processor. In a basic configuration, the processor 38 can include at least one processing portion 40 and memory portion 42. The memory portion 42 can store any information utilized in conjunction with performing multi-tier online game play. Depending upon the exact configuration and type of processor, the memory portion 42 can be volatile (such as RAM) 46, non-volatile (such as ROM, flash memory, etc.) 48, or a combination thereof. The processor 38 can have additional features/functionality. For example, the processor 38 can include additional storage (removable storage 50 and/or non-removable storage 52) including, but not limited to, magnetic or optical disks, tape, flash, smart cards or a combination thereof. Computer storage media, such as memory portion 42, 46, 48, 50, and 52, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 38. Any such computer storage media can be part of the processor 38.

The processor 38 can also contain communications connection(s) 58 that allow the processor 38 to communicate with other devices, such as other devices, for example. Communications connection(s) 58 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 38 also can have input device(s) 56 such as keyboard, mouse, pen, voice input device, touch input device, etc. Output device(s) 54 such as a display, speakers, printer, etc. also can be included.

Figure 5:
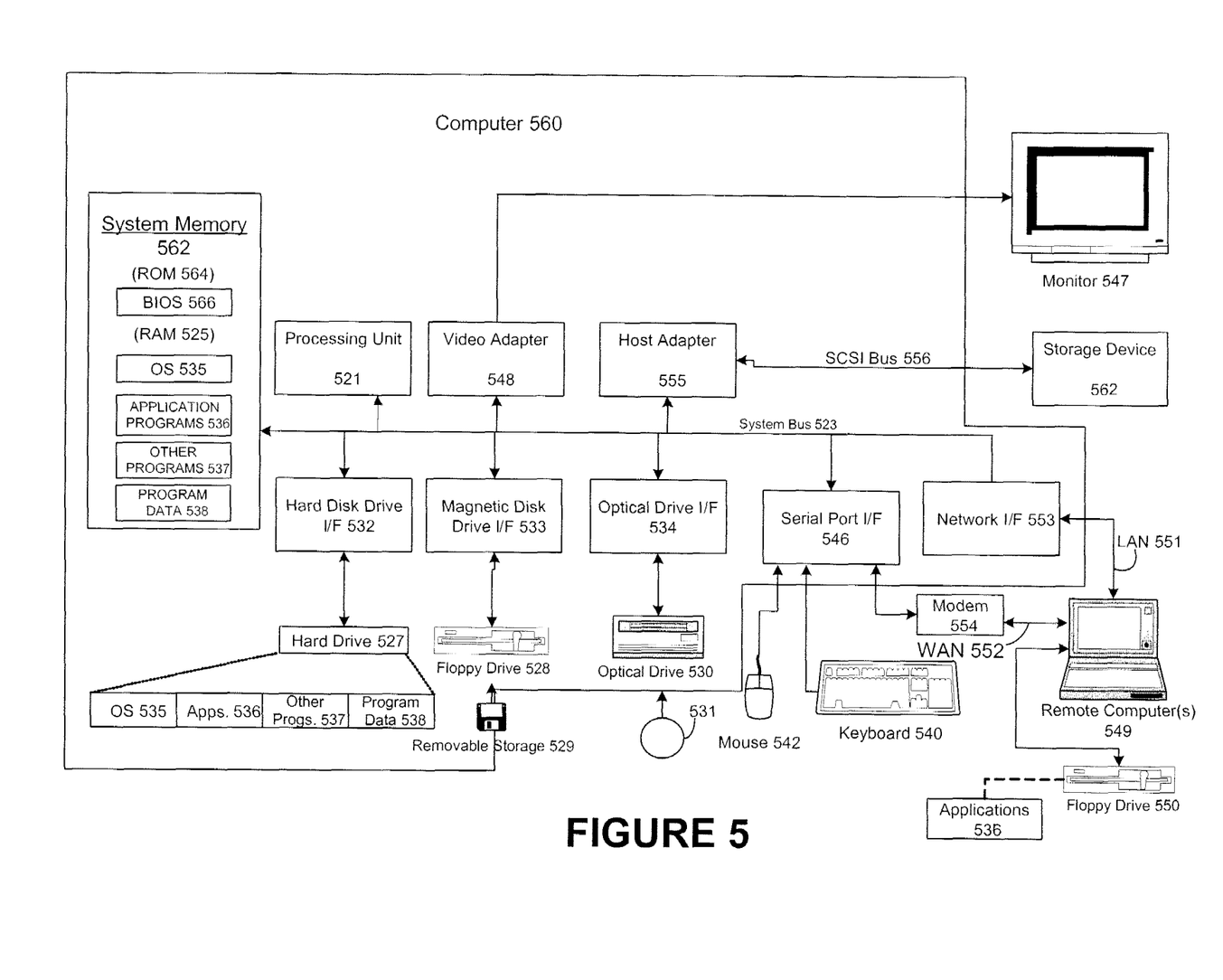
FIG. 5 is a depiction of a suitable computing environment in which multi-tier online game play can be implemented.

FIG. 5 and the following discussion provide a brief general description of a suitable computing environment in which multi-tier online game play can be implemented. Although not required, various aspects of multi-tier online game play can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of multi-tier online game play can be practiced with other computer system configurations, including hand held devices, multi processor systems, microprocessor based or programmable consumer electronics, network PCs, minicomputers, mainframe computers, and the like. Further, multi-tier online game play also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 521, the memory (both ROM 564 and RAM 525), the basic input/output system (BIOS) 566, and various input/output (I/O) devices such as a keyboard 540, a mouse 542, a monitor 547, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with multi-tier online game play as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 5, an exemplary general purpose computing system includes a conventional computing device 560 or the like, including a processing unit 521, a system memory 562, and a system bus 523 that couples various system components including the system memory to the processing unit 521. The system bus 523 may be any of several types of bus structures including a memory bus or memory controller, a peripheral bus, and a local bus using any of a variety of bus architectures. The system memory includes read only memory (ROM) 564 and random access memory (RAM) 525. A basic input/output system 566 (BIOS), containing basic routines that help to transfer information between elements within the computing device 560, such as during start up, is stored in ROM 564. The computing device 560 may further include a hard disk drive 527 for reading from and writing to a hard disk (hard disk not shown), a magnetic disk drive 528 (e.g., floppy drive) for reading from or writing to a removable magnetic disk 529 (e.g., floppy disk, removal storage), and an optical disk drive 530 for reading from or writing to a removable optical disk 531 such as a CD ROM or other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer readable media provide non volatile storage of computer readable instructions, data structures, program modules and other data for the computing device 560. Although the exemplary environment described herein employs a hard disk, a removable magnetic disk 529, and a removable optical disk 531, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 529, optical disk 531, ROM 564, or RAM 525, including an operating system 535, one or more application programs 536, other program modules 537, and program data 538. A user may enter commands and information into the computing device 560 through input devices such as a keyboard 540 and a pointing device (e.g., mouse 542). Other input devices (not shown) may include a microphone, joystick, game pad, satellite disk, scanner, or the like. These and other input devices are often connected to the processing unit 521 through a serial port interface 546 that is coupled to the system bus, but may be connected by other interfaces, such as a parallel port, game port, or universal serial bus (USB). A monitor 547 or other type of display device is also connected to the system bus 523 via an interface, such as a video adapter 548. In addition to the monitor 547, computing devices typically include other peripheral output devices (not shown), such as speakers and printers. The exemplary environment of FIG. 5 also includes a host adapter 555, Small Computer System Interface (SCSI) bus 556, and an external storage device 592 connected to the SCSI bus 556.

The computing device 560 may operate in a networked environment using logical connections to one or more remote computers, such as a remote computer 549. The remote computer 549 may be another computing device (e.g., personal computer), a server, a router, a network PC, a peer device, or other common network node, and typically includes many or all of the elements described above relative to the computing device 560, although only a memory storage device 550 (floppy drive) has been illustrated in FIG. 5. The logical connections depicted in FIG. 5 include a local area network (LAN) 551 and a wide area network (WAN) 552. Such networking environments are commonplace in offices, enterprise wide computer networks, intranets and the Internet.

When used in a LAN networking environment, the computing device 560 is connected to the LAN 551 through a network interface or adapter 553. When used in a WAN networking environment, the computing device 560 can include a modem 554 or other means for establishing communications over the wide area network 552, such as the Internet. The modem 554, which may be internal or external, is connected to the system bus 523 via the serial port interface 546. In a networked environment, program modules depicted relative to the computing device 560, or portions thereof, may be stored in the remote memory storage device. It will be appreciated that the network connections shown are exemplary and other means of establishing a communications link between the computers may be used.

While it is envisioned that numerous embodiments of multi-tier online game play are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for implementing multi-tier online game play, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing multi-tier online game play.

The program(s) can be implemented in assembly or machine language, if desired. In any case, the language can be a compiled or interpreted language, and combined with hardware implementations. The methods and apparatuses for implementing multi-tier online game play also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of multi-tier online game play. Additionally, any storage techniques used in connection with multi-tier online game play can invariably be a combination of hardware and software.

While multi-tier online game play has been described in connection with the example embodiments of the various figures, it is to be understood that other similar embodiments can be used or modifications and additions can be made to the described embodiments for performing the same functions of multi-tier online game play without deviating therefrom. Therefore, multi-tier online game play as described herein should not be limited to any single embodiment, but rather should be construed in breadth and scope in accordance with the appended claims.

What is claimed is:

1. A method comprising:
providing, via a gaming device, a first tier of game playing that includes a first set of game playing features and an enticement directed at enticing a first tier game player to participate in a second tier of game playing;
visually rendering via a display of the gaming device, a first portion of the enticement comprising an invitation to the first tier game player to join a multiplayer game session, but denying the first tier game player the ability to accept an offer;
visually rendering via the display of the gaming device, a second portion of the enticement comprising a list of game sessions available to first and second tier game players, with at least one game session that is unavailable to the first tier game player visually emphasized in comparison to a game session that is available to the first tier game player, wherein the visual emphasis is applied to draw attention to the at least one game session that is unavailable in the first tier of game playing but would be available upon a subscription to the second tier of game playing; and
responsive to an indication that a subscription to the second tier of game playing has been activated, removing, by the gaming device, the visual emphasis and making an exclusive feature available to the first tier game player.

2. A method according to claim 1, wherein:
a subscription fee is charged to participate in the second tier of game playing; and
no subscription fee is charged to participate in the first tier of game playing.

3. A method according to claim 1, further comprising:
imposing at least one restriction upon the first tier game player in joining a game session; and
eliminating the at least one restriction upon a second tier game player joining the game session.

4. A method according to claim 3, wherein the at least one restriction comprises allowing less than a maximum number of game players to participate in a multiplayer online game session.

5. A method according to claim 1, wherein the exclusive feature comprises at least one of:
an ability to participate in restricted multiplayer online game sessions restricted to only subscribers of the second tier of game playing; and
an ability to participate in multiplayer online game sessions utilizing a combination of a dedicated game console, a general purpose processor, and a mobile device.

6. A method according to claim 1, wherein the exclusive feature comprises at least one of:
an indication of achievements earned during a multiplayer online game session;
an indication of scores earned by players during a multiplayer online game session;
an indication of rank among players of a multiplayer online game session;
an ability to invite players to participate in a multiplayer online game session;
an ability to accept an invitation to participate in a multiplayer online game session;
an indication of characteristics of multiplayer online game sessions; and
an indication of characteristics of online game players.

7. A method according to claim 1, wherein the enticement further comprises at least one of:
an indication of achievements that could have been earned subject to participation in the second tier of game playing; and
an indication of a score that could have been earned subject to participation in the second tier of game playing.

8. A gaming device comprising:
a processor; and
memory coupled to the processor, the memory comprising executable instructions that when executed by the processor cause the processor to effectuate operations comprising:
providing a first tier of game playing comprising a first set of game playing features together with a visual enticement directed at enticing a first tier game player to subscribe to a second tier of game playing;
visually rendering via a display of the gaming device, a first portion of the visual enticement comprising an invitation to the first tier game player to join a multiplayer game session, but denying the first tier game player the ability to accept an offer; and
visually rendering via the display, a second portion of the visual enticement comprising an indication of achievements that could have been earned by the first tier game player if the first tier game player had participated in the second tier of game playing, thereby drawing attention to an exclusive feature that is unavailable in the first tier of game playing but would be available upon a subscription to the second tier of game playing.

9. The gaming device of claim 8, wherein:
a subscription fee is charged to participate in the second tier of game playing; and
no subscription fee is charged to participate in the first tier of game playing.

10. The gaming device of claim 8, wherein the exclusive feature comprises an exclusive online game playing feature.

11. The gaming device of claim 8, wherein the first set of game playing features comprises:
an ability to host, on a dedicated processor, a multiplayer online game session;
an ability to browse a list of dedicated processor-hosted multiplayer online game sessions; and
an ability to join a multiplayer online game session, wherein:
at least one restriction to joining a multiplayer online game session is imposed on game players participating in the first tier of game playing; and the at least one restriction to joining a multiplayer online game session is not imposed on game players participating in the second tier of game playing.

12. The gaming device of claim 8, wherein the exclusive feature comprises at least one of:
an ability to accept an invitation to play a game;
an ability to hear but not be heard in voice communications between players during a multiplayer online game session;
an ability to participate in restricted multiplayer online game sessions restricted to only subscribers of the second tier of game playing; and
an ability to participate in multiplayer online game sessions utilizing a combination of a dedicated game console, a general purpose processor, and a mobile device.

13. The gaming device of claim 8, wherein the exclusive feature comprises at least one of:
an indication of achievements earned during a multiplayer online game session;
an indication of scores earned by players during a multiplayer online game session;
an indication of rank among players of a multiplayer online game session;
an ability to invite players to participate in a multiplayer online game session;
an ability to accept an invitation to participate in a multiplayer online game session;
an indication of characteristics of multiplayer online game sessions; and
an indication of characteristics of online game players.

14. The gaming device of claim 8, wherein the visual enticement further comprises at least one of:
an indication that advertises the ability to hear players participating in a multiplayer online game session and while not being heard by players participating in the multiplayer online game session; and
an indication of a score that could have been earned subject to participation in the second tier of game playing.

15. A computer-readable memory comprising executable instruction that when executed by a processor cause the processor to effectuate operations comprising:
providing a first tier of game playing that includes a first set of game playing features together with an enticement directed at enticing a first tier game player to participate in a second tier of game playing;
visually rendering via a display, a first portion of the enticement comprising an invitation to the first tier game player to join a multiplayer game session, but denying the first tier game player the ability to accept an offer; and
visually rendering via the display, a second portion of the enticement comprising a visual emphasis applied upon a representation of an exclusive feature in order to draw attention to the exclusive feature and for indicating that the exclusive feature is unavailable in the first tier of game playing but would be available upon a subscription to the second tier of game playing, the exclusive feature comprising an ability to hear players participating in a multiplayer online game session without being heard by the players participating in the multiplayer online game session;
providing, to subscribers thereof, the second tier of game playing, wherein:
an intended recipient of the provided second tier of game playing is a subscriber of the second tier of game playing; and
the second tier of game playing comprises the first set of game playing features and at least one exclusive game playing feature; wherein the at least one exclusive game playing feature is not available in the first tier of game playing; and wherein the representation of the exclusive feature is provided in the first tier of game playing in the form of a visually enhanced description of the exclusive feature.

16. A computer-readable memory according to claim 15, the operations further comprising:
providing an ability to host, on a dedicated processor, a multiplayer online game session;
providing an ability to browse a list of dedicated processor-hosted multiplayer online game sessions; and
providing an ability to join a multiplayer online game session, wherein:
at least one restriction to joining a multiplayer online game session is imposed on game players participating in the first tier of game playing; and
the at least one restriction to joining a multiplayer online game session is not imposed on game players participating in the second tier of game playing.

17. A computer-readable memory according to claim 15, wherein the at least one exclusive game playing feature comprises at least one of:
an ability to accept an invitation to play a game;
an ability to participate in restricted multiplayer online game sessions restricted to only subscribers of the second tier of game playing; and
an ability to participate in multiplayer online game sessions utilizing a combination of a dedicated game console, a general purpose processor, and a mobile device;
an indication of achievements earned during a multiplayer online game session;
an indication of scores earned by players during a multiplayer online game session;
an indication of rank among players of a multiplayer online game session;
an ability to invite players to participate in a multiplayer online game session;
an ability to accept an invitation to participate in a multiplayer online game session;
an indication of characteristics of multiplayer online game sessions; and
an indication of characteristics of online game players.

18. A computer-readable memory according to claim 15, the enticement comprises at least one of:
an indication of multiplayer game sessions having less than a maximum number of players participating therein, wherein the indication of multiplayer game sessions having less than a maximum number of players participating therein is emphasized to indicate that participation by additional players is limited to subscribers of the second tier of game playing;
an indication of achievements that could have been earned subject to participation in the second tier of game playing; and
an indication of a score that could have been earned subject to participation in the second tier of game playing.

19. A method according to claim 1, wherein:
the visual emphasis comprises highlighting; and
removing the visual emphasis comprises removing the highlighting.

* * * * *